Jan. 24, 1928.

A. D. DAGLEY 1,657,299

PASTRY FORMING DEVICE

Filed Feb. 8, 1926

INVENTOR.
Artie D. Dagley
BY
Cyrus W. Rice
ATTORNEY.

WITNESS

Patented Jan. 24, 1928.

1,657,299

UNITED STATES PATENT OFFICE.

ARLIE D. DAGLEY, OF GRAND RAPIDS, MICHIGAN.

PASTRY-FORMING DEVICE.

Application filed February 8, 1926. Serial No. 86,736.

The present invention relates to pastry-forming devices; and its object is, generally, to provide a device of that character improved in respects hereinafter appearing; and, more particularly, to provide such a device whereby cookies and the like may be readily formed and with edges of a desired configuration.

This object is attained by, and the invention finds preferable embodiment in, the device hereinafter particularly described in the body of this specification and illustrated by the accompanying drawings, in which.

Figure 1:
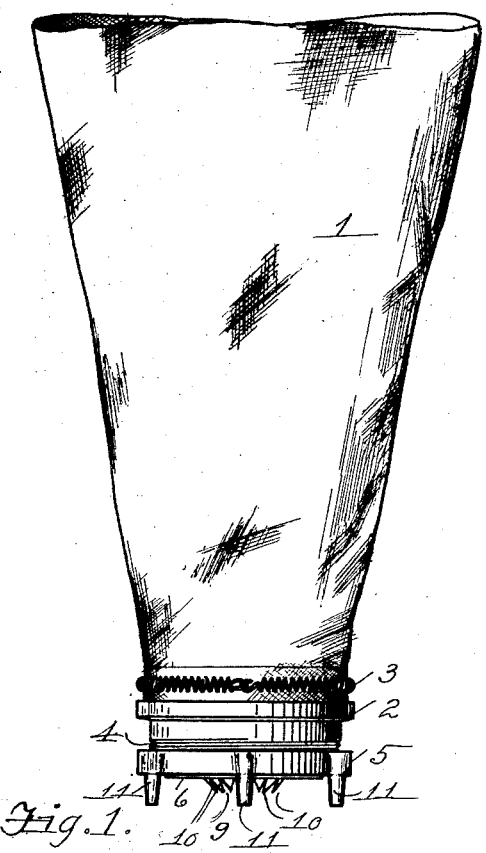
Figure 1 is a side view of a pastry-forming device.
Figure 3:
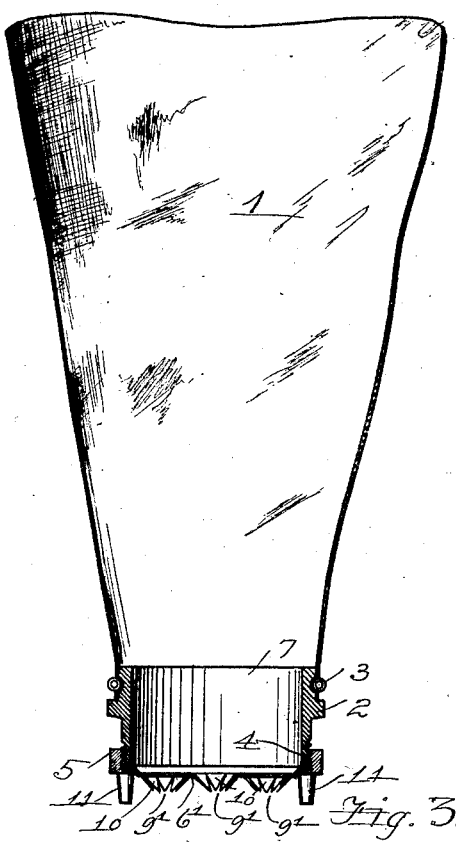
Figure 3 is a longitudinal central sectional view of a pastry-forming device taken on line 3—3 of Figure 4, and showing a slightly modified construction.
Figure 2:
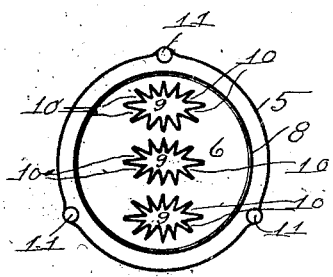
Figure 2 is a bottom plan view thereof.
Figure 4:
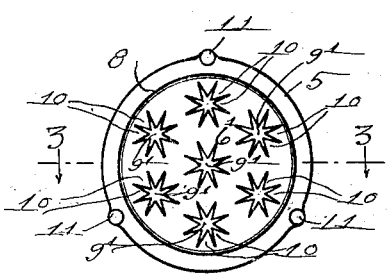
Figure 4 is a bottom plan view of the same.

In the device illustrated by the accompanying drawings, a container having a collapsible portion 1 made of cloth or the like is adapted to contain the paste from which cakes or "cookies" or other such pastry are to be made. This container has an annular bottom member 2 detachably secured to the collapsible portion 1 of the container as by a helical-spring-band 3. Said bottom member has a threaded lower end 4 on which is turned the threaded annular element 5. Between said member 2 and element 5 is clamped a removable disk 6 or $6^1$ extending transversely of the openings 7 and 8 through member 2 and element 5. This disk has one or more pastry-forming openings 9 or $9^1$ therethrough, provided with pointed fingers 10 extending downwardly and inclinedly toward each other. The paste in the container may be thrust through the pastry-forming openings 9, $9^1$ by the container's portion 1 to expel a sufficient amount of the paste therein to form a cooky or the like of desired size, such expelled portion being formed by the fingers 10, into a cooky whose edge has a configuration formed by the fingers. The element 5 is desirably provided with downwardly extending legs 11 adapted to rest during the device's operation on the plate or surface on which the formed pastry is received.

The pastry-forming openings may be of various shapes, as 9, $9^1$, etc., different disks, as 6, $6^1$, etc., having such different openings may be used in the device as desired.

The invention being intended to be pointed out in the claims, is not to be limited to or by details of construction of the particular embodiment thereof illustrated by the drawings or hereinbefore described.

I claim:

1. In a device of the character described: a paste container having an annular bottom member; an annular element detachably connected to said member and having downwardly extending legs; a disk having a pastry-forming opening therethrough and adapted to be held in fixed relation with the legs between said member and said element in their assembled position.

2. In a device of the character described: a paste container having an annular bottom member; an annular element threaded on said member and having downwardly extending legs; a disk having a pastry-forming opening therethrough and adapted to be held in fixed position between said member and said element in their assembled position.

In testimony whereof I have hereunto set my hand at Grand Rapids, Michigan, this 4th day of February, 1926.

ARLIE D. DAGLEY.